United States Patent
Tauschek et al.

(10) Patent No.: US 6,370,979 B1
(45) Date of Patent: Apr. 16, 2002

(54) CLUTCH GEARING ESPECIALLY FOR A MANUAL TRANSMISSION

(75) Inventors: Georg Tauschek; Peter Gutmann, both of Munich; Gerd Weissmann, Finsing, all of (DE)

(73) Assignee: BLW Praezisionsschmiede GmbH, Munich (DE)

( * ) Notice: Subject to any disclaimer, the term of this patent is extended or adjusted under 35 U.S.C. 154(b) by 0 days.

(21) Appl. No.: 09/509,168

(22) PCT Filed: Sep. 16, 1998

(86) PCT No.: PCT/EP98/05855

§ 371 Date: Mar. 20, 2000

§ 102(e) Date: Mar. 20, 2000

(87) PCT Pub. No.: WO99/15804

PCT Pub. Date: Apr. 1, 1999

(30) Foreign Application Priority Data

Sep. 20, 1997 (DE) ......................................... 197 41 613

(51) Int. Cl.⁷ ............................................. F16D 23/02
(52) U.S. Cl. ............................ 74/462; 74/339; 192/108
(58) Field of Search ......................... 74/462, 457, 339; 192/69.9, 69.91, 69.7, 108

(56) References Cited

U.S. PATENT DOCUMENTS

| 1,935,965 | A | * | 11/1933 | Wahlberg | 192/67 |
| 3,367,462 | A | * | 2/1968 | Bibbens | 192/55 |
| 4,782,929 | A | * | 11/1988 | Müller | 192/53 F |
| 5,960,925 | A | * | 10/1999 | Helms et al. | 192/108 |
| 6,044,951 | A | * | 4/2000 | Gutmann et al. | 192/108 |

FOREIGN PATENT DOCUMENTS

| DE | 84 38 446.8 | | 3/1989 |
| DE | 195 31 155 A | | 2/1997 |
| EP | 0762003 A1 | * | of 1996 |
| JP | 03 288052 | | 12/1991 |

\* cited by examiner

Primary Examiner—David Fenstermacher
(74) Attorney, Agent, or Firm—Rosenman & Colin LLP

(57) ABSTRACT

In a coupling tooth formation, in particular in a gear box, either on a gear sleeve or on a gear wheel, the teeth are fitted to the base end of a cylindrical base (12) in relation to the rotational axis, elongate in axial direction and provided at their coupling end with a roof outline sloping from the tooth base towards the tooth head, comprising a rounded roof edge (5); the radius of the roof edge rounding increases from the tooth base towards the tooth head according to a pre-set function in order to design the procedure of the tracking process after the initial contact as smoothly running as possible.

6 Claims, 8 Drawing Sheets

CLUTCH GEARING ESPECIALLY FOR A MANUAL TRANSMISSION

BACKGROUND OF THE INVENTION

1. Field of the Invention

The invention relates to a coupling tooth formation, in particular in a gear box, either on a gear sleeve or on a gear wheel, the teeth of which are positioned at a cylindrical base in relation to the rotational axis, elongate in axial direction and provided at their coupling end with a roof contour sloping from the tooth base towards the tooth head, comprising a rounded roof edge.

2. Description of Related Art

Gear sleeves are known (DE 19604386 A1, DE 19531155 A1) the teeth of which comprise roof-shaped surfaces which together form a rounded edge. Furthermore, symmetrical and asymmetrical roof configurations are known and those having a sloping roof contour; the latter serves to additionally facilitate tracking of the two teeth partners of a set of coupling teeth. In this context it is the object of the person skilled in the art to attain that during the initial contact of the two tooth formations their contact is reduced to a minimum of points or lines; this permits the friction-reduced and, therefore, smooth-running interlocking of both tooth formation partners of a set of coupling teeth. However, in this process still too little attention is paid to the further procedure of the tracking process, that is to say, after the initial contact has already taken place. This is where the present invention sets in by pursuing the object of realizing the smoothest possible transition in the phase between the initial contact and the final coupling position.

SUMMARY OF THE INVENTION

This object is attained according to the invention in that the radius of the roof edge rounding increases from the tooth base towards the tooth head according to a pre-set function.

This measure results in a continuous increase of the contact points or the extension of the contact lines until finally the desired surface contact is attained between the power transmitting tooth flanges. During the initial contact, i.e. in the proximity of the foot region with a correspondingly greater tooth depth, the tooth formation offers a particularly great tolerance for the mutual engagement as the radius of the roof edge rounding is relatively small there. With an increasing engagement, i.e. increasing axial shifting of the two interlocking teeth, an increasing centering of the two teeth formations in relation to one another is brought about according to the widening of the roof edge in the tooth head region due to the relatively larger radii there of the roof edge rounding, until their maximum contact is realized upon reaching complete engagement.

In the process, the person operating the gear box, gets the impression of a smoother gear changing procedure as if, after the initial contact, the switched gear is put in quasi automatically. This impression is further strengthened if the increase in radius proceeds progressively, e.g. according to an exponential function or a circular function instead of a linear function.

A particularly advantageous progression from the foot cylinder towards the head cylinder of the tooth formation defines an altogether six-fold increase of the radius in which context doubling is only reached at about 60% of the relative tooth height.

As regards the configuration of a short tooth formation of this kind as a whole, one could, in a graphic transposition of the rules according to the invention, compare the roof shape, in the case of a symmetrical tooth, with a human nose which, at the base of the nose, corresponding comparatively to the foot cylinder of the tooth formation, is designed particularly narrow, subsequently becoming broader up to the tip of the nose. The bridge of the nose may in this context slope either rectilinearly or by being bent downwardly, the lowest point of the nose, by way of comparison, corresponding to the head cylinder of the tooth formation. In order to remain with the demonstrated image, the longitudinal body axis of the nose carrier would correspond to the rotational axis of the tooth formation.

As regards the oblique roof surfaces laterally adjoining the roof edge, these are preferably designed as level planes. This facilitates their shaping in a deformation process. e.g. for the manufacture as a forged part, in which context one or more calibrating steps may follow onto a forging step.

Arched roof surfaces are, however, likewise conceivable within the scope of the invention, but their precise manufacture encounters difficulties with regard to minimum deformations as in the case of coupling teeth. This applies similarly to asymmetrical roof shapes, the manufacture of which presupposes likewise a high precision of the forming tools or of the deformation process.

BRIEF DESCRIPTION OF THE DRAWING

The invention is elucidated in the following by way of a number of embodiments. There are shown in FIGS. 1 to 4 a tooth of a tooth formation with a proportional radius increase, in four different views.

DETAILED DESCRIPTION OF THE INVENTION

Figure 1:
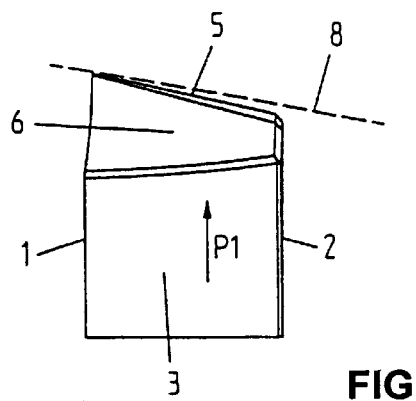
Figure 2:
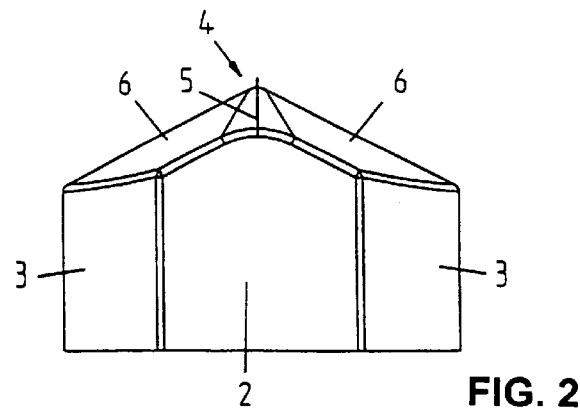

The tooth illustrated in FIGS. 1 to 4 of a tooth formation, e.g. in a sliding sleeve, is designed, as is apparent from the plan view (FIG. 3), somewhat trapezoidal in cross-section, i.e. from the tooth base 1 to the tooth head 2 it comprises obliquely converging side flanges 3. The roof outline of its symmetrical roof shape 4 is characterized by a roof edge 5 sloping from the tooth base 1 to the tooth head 2, being rounded as illustrated in the side elevation according to FIG. 2 as well as in the perspective view according to FIG. 4. Level roof surfaces 6 follow onto the rounded roof edge 5 on both sides. In accordance with the diverging course towards the tooth head 2 of the lateral cutting lines 7 of the rounded roof edge with the adjoining roof surfaces 6, it is readily apparent that the radius of the rounded roof edge increases from the tooth base 1 towards the tooth head 2. This, in the case of level roof surfaces 6, results in a deviation of the roof edge 5 from the theoretical cutting edge 8 of the two roof surfaces 6 illustrated in FIG. 1. Arrow P1 denotes the sliding direction of the tooth during coupling with the counter tooth formation.

Figure 3:
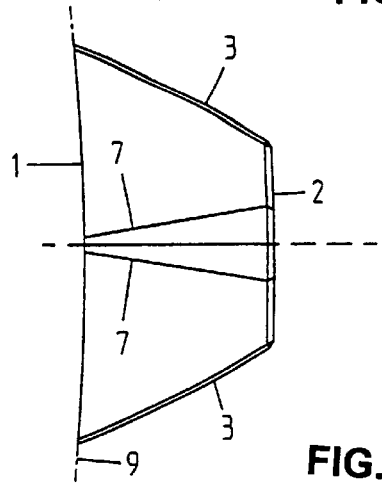
Figure 4:
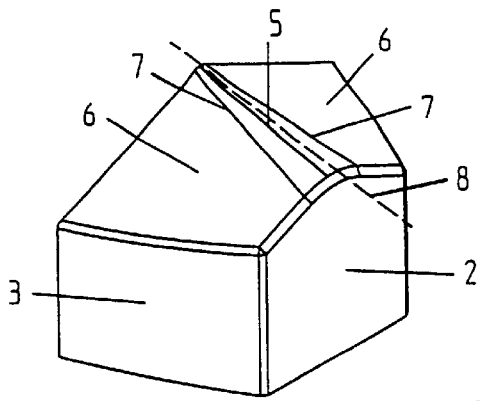

In the plan view according to FIG. 3 the tooth base is illustrated in a slightly curved manner. This pattern is to illustrate the base of the coupling teeth which continues with a dash-dotted extension line 9 the said base being a cylindrical surface having a longitudinal axis parallel to the sliding direction according to arrow P1.

Figure 5:
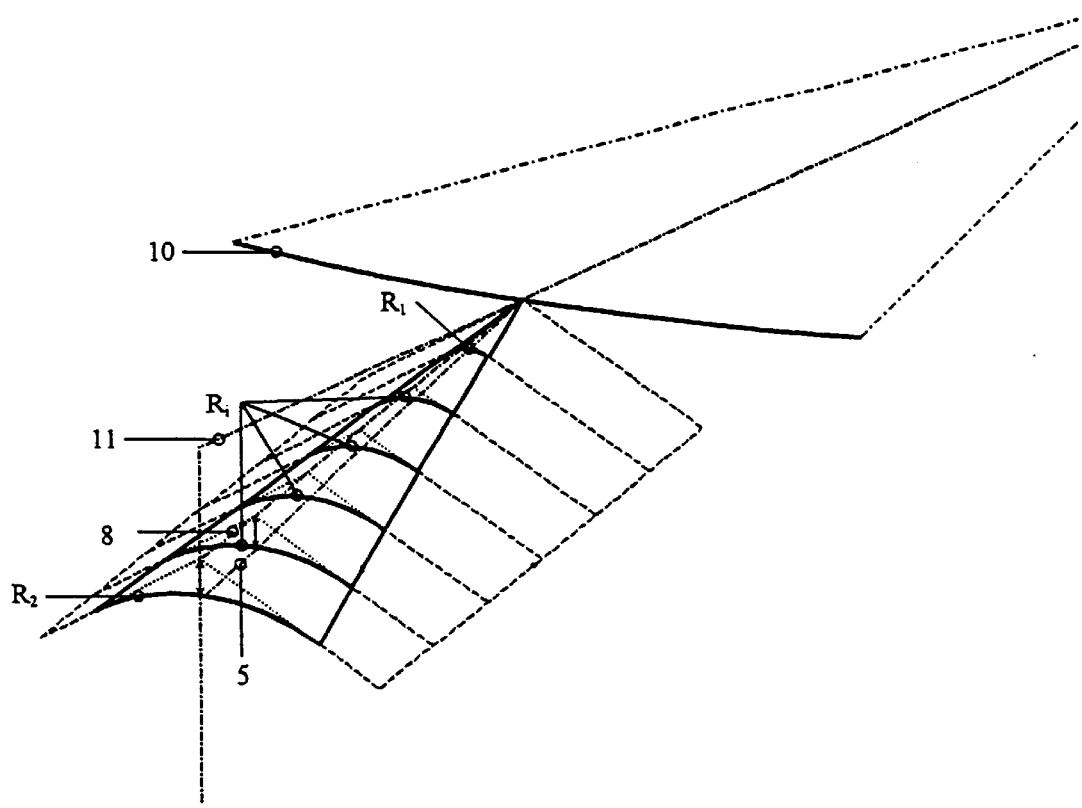
FIG. 5 a graphic illustration of the proportional radius increase.

FIG. 5 is a graphic elucidation of the roof edge rounding of a tooth of a coupling tooth formation according to FIGS. 1 to 4. The roof edge 5 in a sloping manner follows onto the base, indicated by a first structural line 10. Between a radius R1 in the region of the tooth base and a radius R2 in the region of the tooth head four additional radii $R_i$ are indicated by which in their relationship to one another suggest a linear increase of the roof edge radius from the tooth base towards the tooth head.

Figure 6:
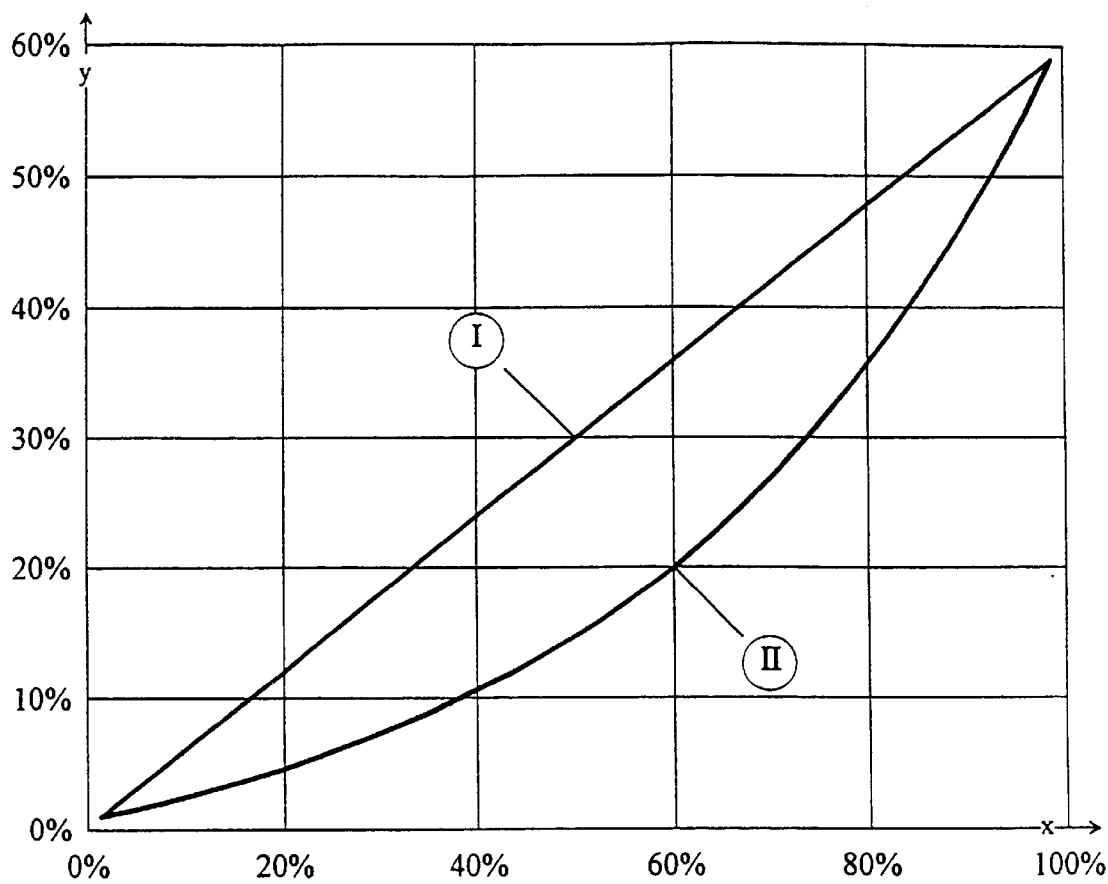
FIG. 6 patterns of the radius increase in a graphic illustration.

According to FIG. 6 the radius increase (y-axis) is graphically illustrated by way of example in the roof edge region in relation to the relative tooth height (x-axis), the tooth height being measured in the direction of a second structural line 11 (FIG. 5), increasing from the tooth base towards the tooth head. Two modifications are indicated in FIG. 6, namely one, straight line I suggesting a linear course of the radius increase, as realized, for example, in a roof shape according to FIGS. 1 to 4; furthermore a curve II of a progressive course of the radius increase as realized, for example, in a symmetrical roof shape according to FIGS. 8 to 11 or in an asymmetrical roof shape according to FIGS. 12 to 15. For both roof shapes reference numerals corresponding to FIGS. 1 to 4 were used so that the renewed elucidation in detail of the individual components of these tooth designs may be dispensed with.

Figure 7:
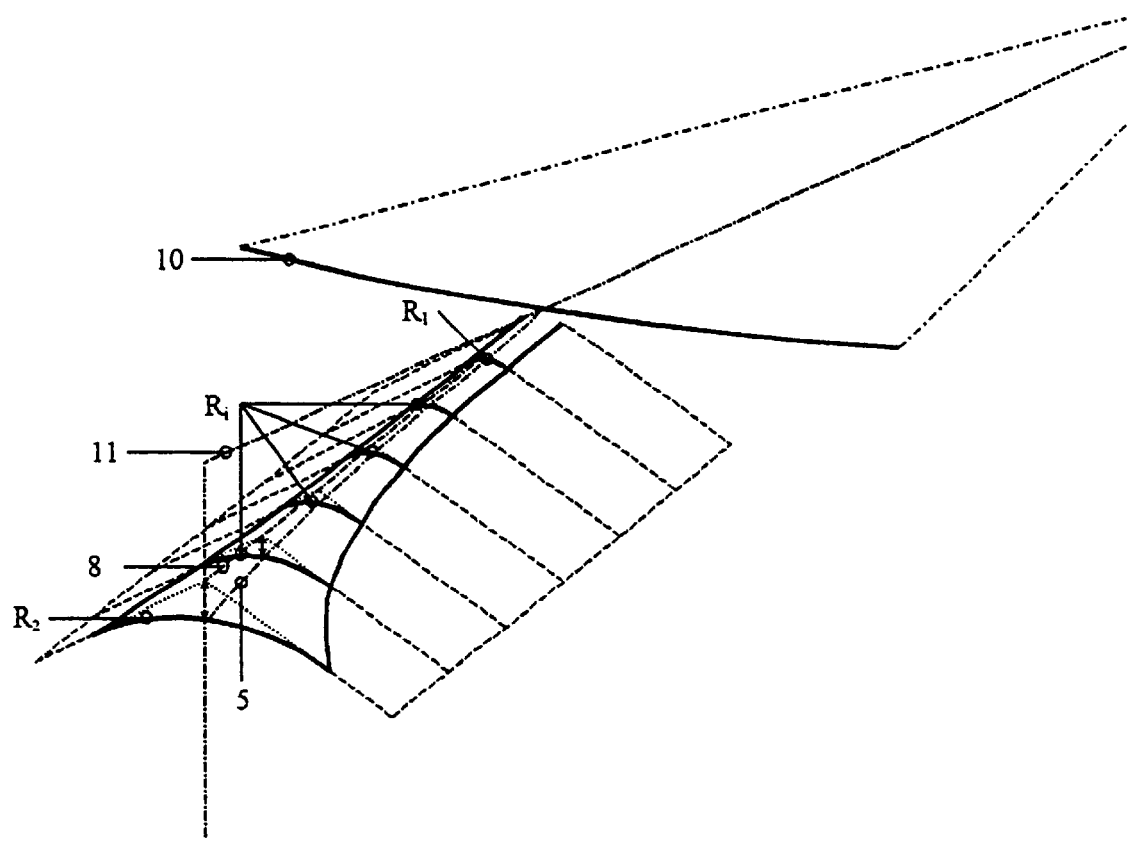
FIG. 7 a graphic illustration of the progressive radius increase.
Figure 8:
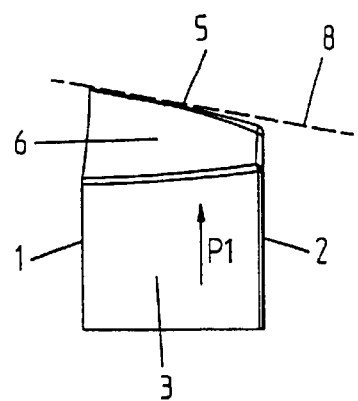
FIGS. 8 to 11 a tooth having a symmetrical roof shape and a progressive radius increase, in four different views, FIGS. 12 to 15 a tooth having an asymmetrical roof shape and a progressive radius increase, in four different views, FIG. 16 a tooth having a symmetrical roof shape in a perspective view and FIG. 17 a tooth having an asymmetrical roof shape in a perspective view
Figure 9:
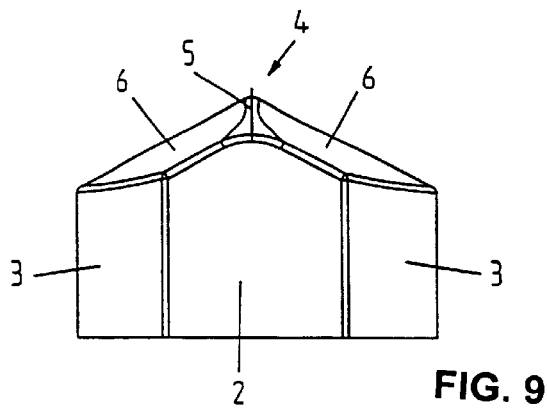
Figure 10:
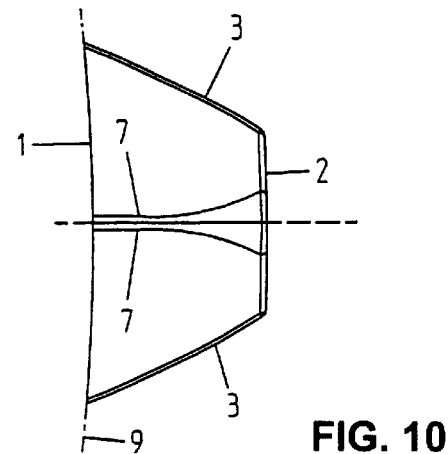
Figure 11:
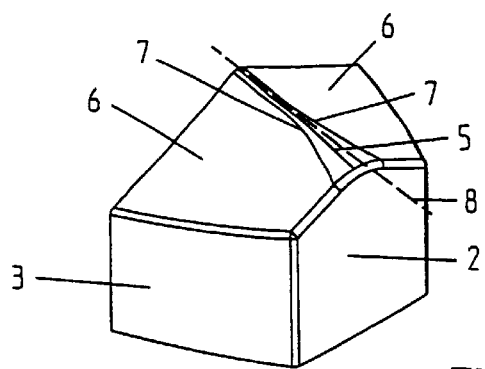
Figure 12:
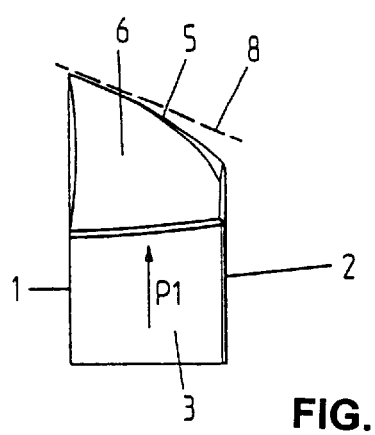

In the case of the tooth design having a progressive radius increase according to FIGS. 8 to 11, the roof edge 5 extends opposite the theoretical cutting edge 8 of the level roof surfaces 6 following a progressively sloping curve which corresponds to the outline of the roof edge 5 according to FIG. 7.

Figure 13:
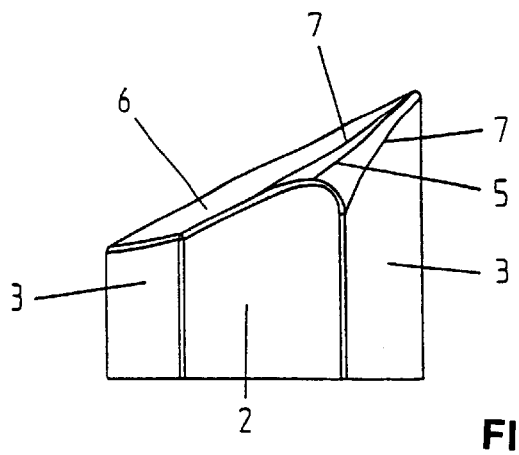
Figure 14:
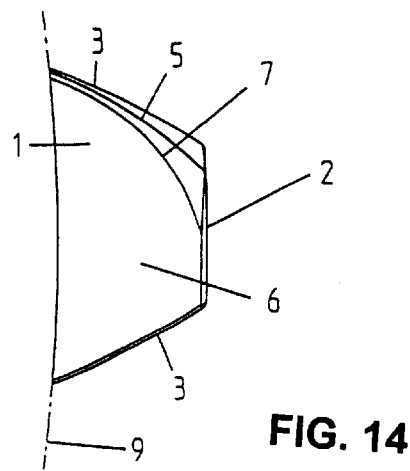
Figure 15:
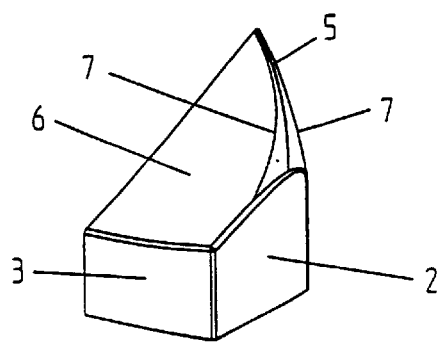

In an asymmetrical tooth design according to FIGS. 12 to 15 the roof is pulled to one side in such an extreme manner that on the steep side of the roof the roof surface coincides with the side flange 3, as is apparent particularly clearly from FIG. 13.

In the drawing all edge lines between the roof surfaces 6, the side flanges 3 and the head surface 2 are drawn by double lines. This serves to indicate the formation of small radii.

Figure 16:
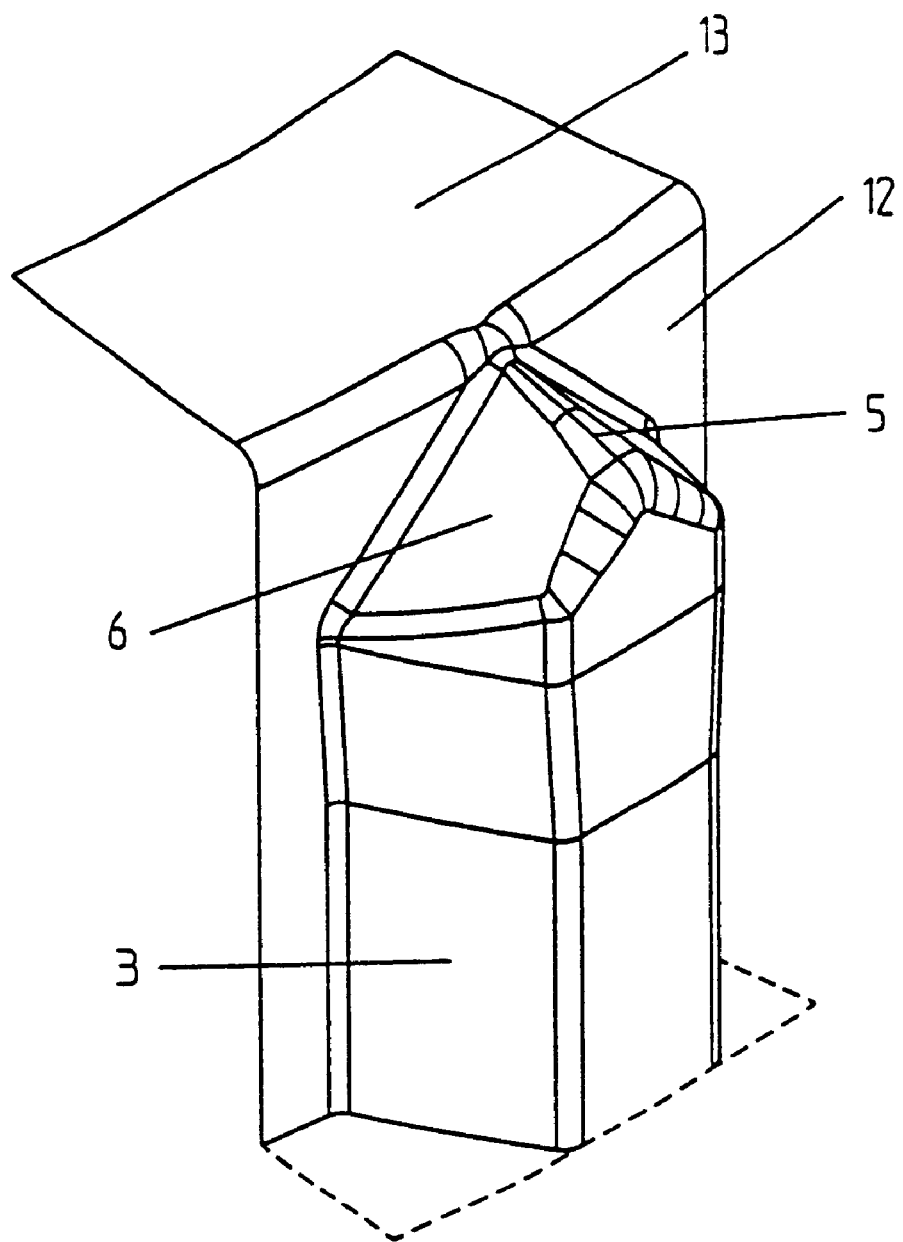
Figure 17:
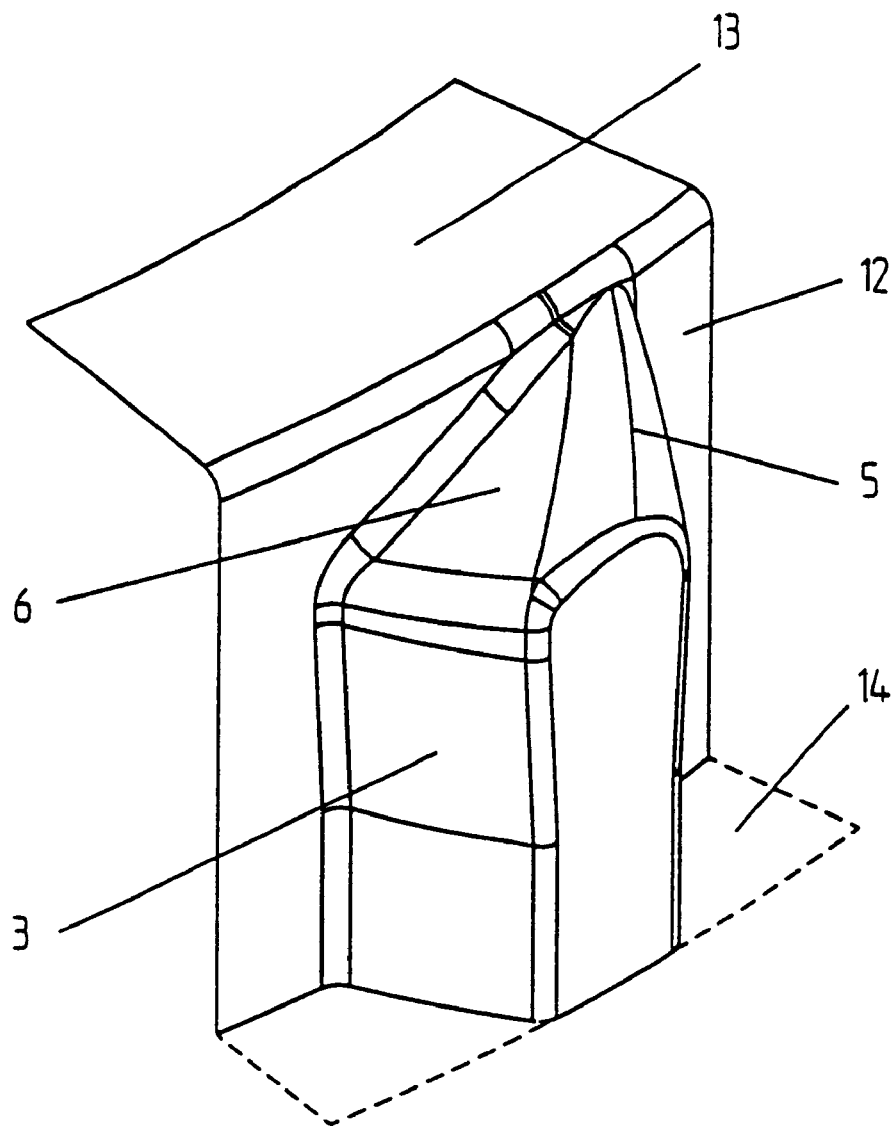

FIGS. 16 and 17 each illustrate in a diagram, supplemented by a line pattern, a section of a tooth having a symmetrical tooth shape (FIG. 16) as well as of a tooth having an asymmetrical tooth shape (FIG. 17). The teeth are fitted to a cylindrical basic body having a base 12 and, with the highest point of their roof surface each follow on to a cover surface 13 of the basic body in a flush manner. The rounded radii are clearly apparent both in the region of the roof edge 5 and also between the roof surfaces 6 and the side flanges 3.

Coupling teeth exist where the base of the teeth opposite the roof surface is also forming part of the basic body by providing an appropriate shoulder 14 there, indicated in FIG. 17 by dashed lines.

What is claimed is:

1. A gear coupling tooth for arrangement on a gear having a rotational axis and a cylindrical outer surface, said tooth comprising:

a tooth base adapted for extension along the gear cylindrical outer surface, a tooth head, and a rounded roof edge sloping from the tooth base towards the tooth head, said rounded roof edge farther comprising a radius that increases from the tooth base towards the tooth head.

2. A gear coupling tooth according to claim 1, wherein the radius of the rounded roof edge increases linearly from the tooth base to the tooth head.

3. A gear coupling tooth according to claim 1, wherein the radius of the rounded roof edge increases progressively from the tooth base to the tooth head.

4. A gear coupling tooth according to claim 1, further comprising sloping roof surfaces abutting the rounded roof edge.

5. A gear coupling tooth according to claim 1, wherein the rounded roof edge slopes progressively from the tooth base to the tooth head.

6. A gear coupling tooth according to claim 1, wherein the rounded roof edge slopes asymmetrically from the tooth base to the tooth head.

* * * * *